(12) United States Patent
Sahara et al.

(10) Patent No.: US 9,686,794 B2
(45) Date of Patent: Jun. 20, 2017

(54) COMMUNICATION SYSTEM, COMMUNICATION METHOD, AND COMMUNICATION APPARATUS (71) Applicant: KYOCERA CORPORATION, Kyoto (JP)

(72) Inventors: Toru Sahara, Yokohama (JP); Toshinori Iinuma, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 25 days.

(21) Appl. No.: 14/764,377

(22) PCT Filed: Jan. 20, 2014

(86) PCT No.: PCT/JP2014/000249
§ 371 (c)(1),
(2) Date: Jul. 29, 2015

(87) PCT Pub. No.: WO2014/119246
PCT Pub. Date: Aug. 7, 2014

(65) Prior Publication Data
US 2015/0373718 A1    Dec. 24, 2015

(30) Foreign Application Priority Data

Jan. 29, 2013  (JP) ................. 2013-014757
Jan. 29, 2013  (JP) ................. 2013-014827

(51) Int. Cl.
H04W 72/04    (2009.01)
H04L 5/00     (2006.01)

(52) U.S. Cl.
CPC ....... *H04W 72/0453* (2013.01); *H04L 5/0053* (2013.01); *H04W 72/0406* (2013.01)

(58) Field of Classification Search
CPC ................................ H04W 72/042
See application file for complete search history.

(56) References Cited

U.S. PATENT DOCUMENTS 8,204,004 B2   6/2012   Hamamoto et al.
8,520,608 B2   8/2013   Ofuji et al.
(Continued)

FOREIGN PATENT DOCUMENTS

EP    2 533 557 A1    12/2012
JP    2008-017318 A    1/2008
(Continued)

OTHER PUBLICATIONS

International Search Report; PCT/JP2014/00024; Mar. 18, 2014.
(Continued)

*Primary Examiner* — Andrew Lai
*Assistant Examiner* — Andrew C Lee
(74) *Attorney, Agent, or Firm* — Studebaker & Brackett PC (57) ABSTRACT

Provided is a communication system that, in using a communication scheme such as TD-LTE, may attain a high speed communication by securing a bandwidth of carriers and prevent radio interference with another system by keeping the carriers within a frequency band assigned to the communication scheme. Specifically, the communication system having a plurality of communication apparatuses for carrying out a radio communication by assigning the plurality of communication apparatuses to a second frequency band with a predetermined bandwidth to be exceeded by carriers serially assigned, assigns the carriers to the second frequency band in such a manner as to overlap a portion of each of the carriers, and a communication apparatus (10*a*) using one of the carriers and a communication apparatus (10*b*) using the other carrier carry out the radio communication by preferentially using respective ranges of the overlapping portion.

12 Claims, 7 Drawing Sheets

(56) References Cited

U.S. PATENT DOCUMENTS

| | | | |
|---|---|---|---|
| 8,908,596 B2* | 12/2014 | Han | H04B 7/0671 370/319 |
| 9,094,982 B2 | 7/2015 | Nobukiyo | |
| 2007/0287464 A1 | 12/2007 | Hamamoto et al. | |
| 2008/0009280 A1 | 1/2008 | Ushiki et al. | |
| 2009/0203384 A1* | 8/2009 | Vujcic | H04W 74/08 455/450 |
| 2010/0008317 A1* | 1/2010 | Bhattad | H04L 1/0003 370/329 |
| 2010/0027483 A1 | 2/2010 | Ofuji et al. | |
| 2011/0081913 A1* | 4/2011 | Lee | H04L 5/003 455/450 |
| 2011/0098074 A1* | 4/2011 | Seo | H04L 5/0007 455/509 |
| 2012/0039268 A1* | 2/2012 | Hakkinen | H04L 5/001 370/329 |
| 2012/0046056 A1* | 2/2012 | Luo | H04J 11/005 455/502 |
| 2012/0263047 A1* | 10/2012 | Love | H04W 72/00 370/252 |
| 2012/0263117 A1* | 10/2012 | Love | H04L 5/003 370/329 |
| 2012/0270585 A1* | 10/2012 | Feng | H04W 28/16 455/507 |
| 2012/0307779 A1* | 12/2012 | Noh | H04B 7/155 370/329 |
| 2013/0005380 A1 | 1/2013 | Nobukiyo | |
| 2013/0021999 A1 | 1/2013 | Jiang | |
| 2014/0126440 A1* | 5/2014 | Frank | H04W 52/06 370/311 |

FOREIGN PATENT DOCUMENTS

| | | |
|---|---|---|
| JP | 2008-28977 A | 2/2008 |
| JP | 2011-101122 A | 5/2011 |
| WO | 2005086516 A1 | 9/2005 |
| WO | 2011125929 A1 | 10/2011 |

OTHER PUBLICATIONS

Written Opinion of the International Searching Authority; PCT/JP2014/000249; Mar. 18, 2014, with concise explanation.

LTE; Evolved Universal Terrestrial Radio Access (E-UTRA); Physical channels and modulation (3GPP TS 36.211 version 9.0.0 Release 9); ETSI TS 136 211 V9.0.0 (Jan. 2010).

3rd Generation Partnership Project; Technical Specification Group Radio Access Network; Evolved Universal Terrestrial Radio Access (E-UTRA); User Equipment (UE) radio transmission and reception (Release 9), 3GPP TS 36.101 V9.0.0 (Jun. 2009).

"Draft of ministerial ordinance to amend part of the Radio Law Enforcement Regulations etc.," Ministry of Internal Affairs and Communications, Oct. 11, 2014, Japan, 10 pp.

Panasonic, "Signaling for UL non-contiguous resource allocation," 3GPP TSG-RAN WG1, R1-101260, San Francisco, CA, Feb. 22-26, 2010, 5 pp.

Willcom, Inc., "Hearing Document of Frequency Consideration Working Group for Realization of Wireless Broadband," Internet URL:http://www.soumu.go.jp/main_content/000071624.pdf, Jun. 22, 2010.

CMCC, LTE-Advanced Carrier Aggregation of Band 39 (Core), 3 GPP TSG-RAN4, R4-130074, Malta, Jan. 28, 2013-Feb. 1, 2013, 14 pp.

TSG RAN WG5 (Testing), "RAN5 agreed non TTCN CR(s) under UE Conformance Test Aspects for LTE for 700 MHz digital dividend (LTE_APAC700-UEConTest)," 3 GPP, RP-121689, Barcelona, Spain, Dec. 4, 2012-Dec. 7, 2012, 3 pp.

JP Office Action dated Nov. 15, 2016 from corresponding JP Appl No. 2013-014757, with concise statement of relevance, 4 pp.

JP Office Action dated Dec. 13, 2016 from corresponding JP Appl No. 2013-014827, with concise statement of relevance, 5 pp.

* cited by examiner

COMMUNICATION SYSTEM, COMMUNICATION METHOD, AND COMMUNICATION APPARATUS

CROSS REFERENCE TO RELATED APPLICATIONS

This application claims priority to and the benefit of Japanese Patent Application No. 2013-14757 (filed on Jan. 29, 2013) and Japanese Patent Application No. 2013-14827 (filed on Jan. 29, 2013), the entire contents of which are incorporated herein by reference.

TECHNICAL FIELD

This disclosure relates to a communication system, a communication method, and a communication apparatus.

BACKGROUND

For example, in a communication system employing TD-LTE as a communication scheme, a carrier used for transmission may take a frequency bandwidth (hereinafter, referred to as a bandwidth) of 1.4 MHz, 3 MHz, 5 MHz, 10 MHz, and 20 MHz (see NPL 1, NPL 2, etc.). The number of resource blocks (RBs) included in each of the bandwidths is 6 RBs, 15 RBs, 25 RBs, 50 RBs, and 100 RBs, respectively. As the bandwidth increases, a communication speed becomes faster. However, since a frequency band and the like assigned for another present communication scheme (a digital cordless telephone, etc.) cannot be shared, it is necessary to set an appropriate bandwidth within an available frequency band.

CITATION LIST

Non-Patent Literatures

NPL 1: 3GPP TS 36.101 Ver. 9.0.0 "LTE; Evolved Universal Terrestrial Radio Access (U-UTRA); User Equipment (UE) radio transmission and reception"

NPL 2: 3GPP TS 36.211 Ver. 9.0.0 "LTE; Evolved Universal Terrestrial Radio Access (U-UTRA); Physical channels and modulation"

For a frequency band of a public PHS, a range with a bandwidth of 9 MHz from 1884.5 MHz to 1893.5 MHz (hereinafter, referred to as a 9 MHz band or a second frequency band) is assigned. For example, in using the communication scheme TD-LTE in the 9 MHz band, it may be considered to set a carrier bandwidth of 5 MHz (hereinafter, also referred to as a first frequency bandwidth) so as to fit within the bandwidth of 9 MHz, and assign one carrier. However, a communication speed with the bandwidth of 5 MHz is slower than that with the bandwidth of 10 MHz. Also, since only the bandwidth of 5 MHz out of the bandwidth of 9 MHz is used for the communication, a communication resource is not efficiently used.

On the other hand, when two carriers with the bandwidth of 5 MHz are serially assigned in the bandwidth of 9 HMz, a total bandwidth of the carriers exceeds the bandwidth of 9 MHz, overlapping an adjacent band assigned to another system (a band of the digital cordless telephone). In particular, although an effective band held by the two carriers with the bandwidth of 5 MHz (the effective band thereof is 4.5 MHz) is 9 MHz, leaked power overlaps the frequency band of the digital cordless telephone, causing radio interference.

Accordingly, it could be helpful to provide a communication system, a communication method, and a communication apparatus those being capable of, in the communication scheme such as the TD-LTE, attaining a high speed communication by securing the bandwidth of the carriers and preventing radio interference with another system by keeping the carriers within the frequency band (for example, the 9 MHz band) assigned to the communication scheme.

SUMMARY

In order to solve the above problem, our communication system having a plurality of communication apparatuses for carrying out a radio communication by assigning a plurality of carriers to a second frequency band with a predetermined bandwidth to be exceeded by carriers with a first frequency bandwidth serially assigned, the communication system assigning each of the carriers to the second frequency band in such a manner as to overlap a portion of each of the carriers, and a first communication apparatus using one of the carriers having the overlapping portion and a second communication apparatus using the other carrier carrying out the radio communication by preferentially using respective ranges of the overlapping portion.

In the communication system, the first communication apparatus and the second communication apparatus carry out the radio communications with other communication apparatuses by preferentially using respective radio resources obtained by dividing the overlapping portion by the radio resource as a unit based on a frequency and time.

In the communication system, control data are transmitted by using the overlapping portion.

In the communication system, an effective band for transmitting and receiving a radio signal in the first frequency bandwidth is 4.5 MHz, and the bandwidth of the second frequency band and the bandwidth of the overlapping portion are 9 MHz and 0.9 MHz, respectively.

In the communication system, the overlapping portion consists of 10 slots, and the first communication apparatus preferentially uses a range of the overlapping portion with a higher frequency, while the second communication apparatus preferentially uses a range of the overlapping portion with a lower frequency.

Also, our communication method having a plurality of communication apparatuses for carrying out a radio communication by assigning a plurality of carriers to a second frequency band with a predetermined bandwidth to be exceeded by carriers with a first frequency bandwidth serially assigned, the communication method including:

assigning each of the carriers to the second frequency band in such a manner as to overlap a portion of each of the carriers, and a first communication apparatus using one of the carriers having the overlapping portion and a second communication apparatus using the other carrier carrying out the radio communication by preferentially using respective ranges of the overlapping portion.

In the communication method, the first communication apparatus and the second communication apparatus carry out the radio communications with other communication apparatuses by preferentially using respective radio resources obtained by dividing the overlapping portion by the radio resource as a unit based on a frequency and time.

The communication method includes transmitting control data by using the overlapping portion.

In the communication method, an effective band for transmitting and receiving a radio signal in the first frequency bandwidth is 4.5 MHz, and the bandwidth of the second frequency band and the bandwidth of the overlapping portion are 9 MHz and 0.9 MHz, respectively.

In the communication method, the overlapping portion consists of 10 slots, and the first communication apparatus preferentially uses a range of the overlapping portion with a higher frequency, while the second communication apparatus preferentially uses a range of the overlapping portion with a lower frequency.

Further, our communication apparatus of a communication system having a plurality of communication apparatuses for carrying out a radio communication by assigning a plurality of carriers to a second frequency band with a predetermined bandwidth to be exceeded by carriers with a first frequency bandwidth serially assigned, the communication apparatus using one of the carriers assigned to the second frequency band in such a manner as to overlap a portion of each of the carriers, and dividing the overlapping portion into ranges assigned to each of the communication apparatuses and carrying out the radio communication by preferentially using the range assigned to the communication apparatus of its own.

The communication apparatus carries out the radio communication with another communication apparatus by preferentially using a radio resource obtained by dividing the overlapping portion by the radio resource as a unit based on a frequency and time.

The communication apparatus transmits control data by using the overlapping portion.

For the communication apparatus, an effective band for transmitting and receiving a radio signal in the first frequency bandwidth is 4.5 MHz, and the bandwidth of the second frequency band and the bandwidth of the overlapping portion are 9 MHz and 0.9 MHz, respectively.

For the communication apparatus, the overlapping portion consists of 10 slots, and the first communication apparatus preferentially uses a range of the overlapping portion with a higher frequency, while the second communication apparatus uses a range of the overlapping portion with a lower frequency.

Our communication system, communication method, and communication apparatus, in a communication scheme such as TD-LTE and the like, may attain a high speed communication by securing the bandwidth of the carriers and prevent radio interference with another system by keeping the carriers within the frequency band (e.g., a 9 MHz band) assigned to the communication scheme.

DETAILED DESCRIPTION

Hereinafter, an embodiment will be described.

Embodiment

Figure 1:
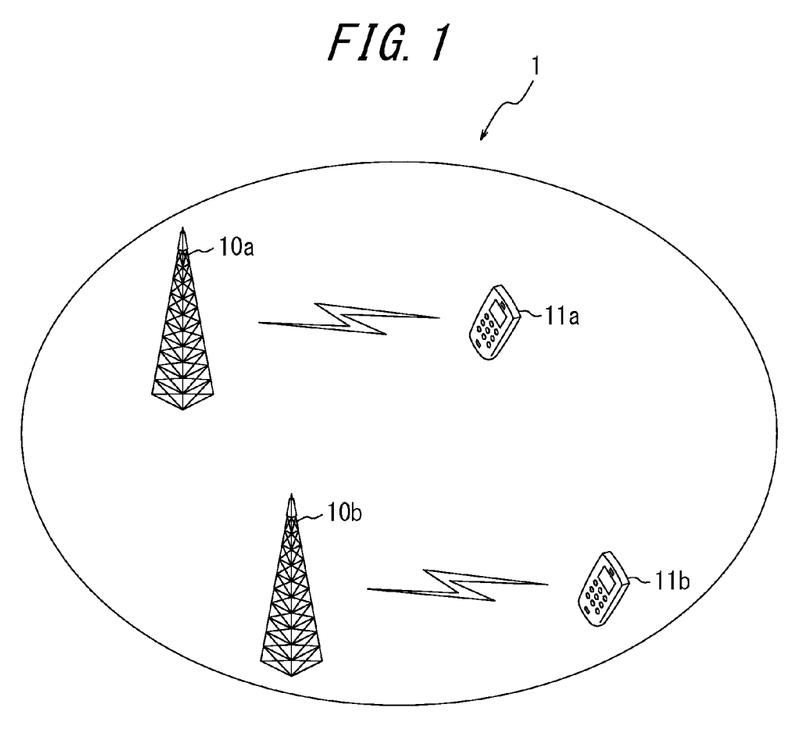
FIG. 1 is a schematic diagram of a communication system according to one embodiment.

FIG. 1 is a schematic diagram of a communication system 1 according to one embodiment. The communication system 1 includes a plurality of communication apparatuses. As illustrated in FIG. 1, for example, the communication unit 1 includes a communication apparatus 10a (a base station 10a) and a communication apparatus 10b (a base station 10b), to which a communication apparatus 11a (a mobile station 11a) and a communication apparatus 11b (a mobile station 11b) are connected, respectively. Although in FIG. 1 the communication system 1 includes two base stations and two mobile stations, the number of the base stations and the mobile stations included in the communication system 1 is not restrictive thereto but may be more than two.

The communication system 1 employs a communication scheme such as TD-LTE, LIE, or the like. Hereinafter, it is assumed that the communication system 1 employs the TD-LTE. Also, the communication system 1 carries out a radio communication by assigning two carries with a bandwidth (a first frequency bandwidth) of 5 MHz (an effective band of 4.5 MHz) in a 9 MHz band (a second frequency band). Hereinafter, the two carriers assigned to the second frequency band will be referred to as a carrier A and a carrier B. For example, the base station 10a and the communication apparatus 11a communicate with each other by using the carrier A, and the base station 10b and the communication apparatus 11b communicate with each other by using the carrier B.

Figure 2A:
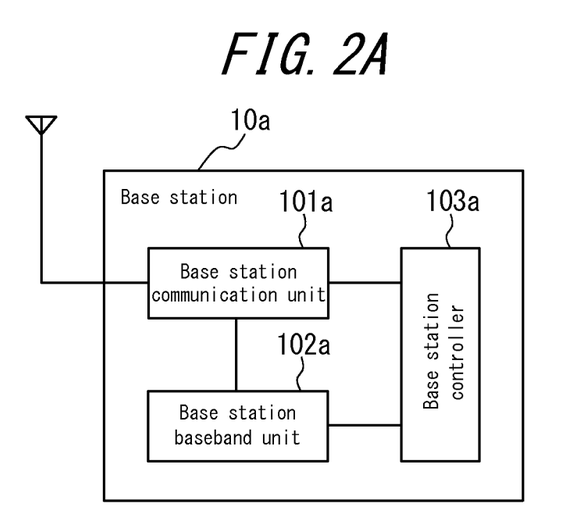
FIGS. 2A and 2B are block diagrams of base stations according to one embodiment.
Figure 2B:
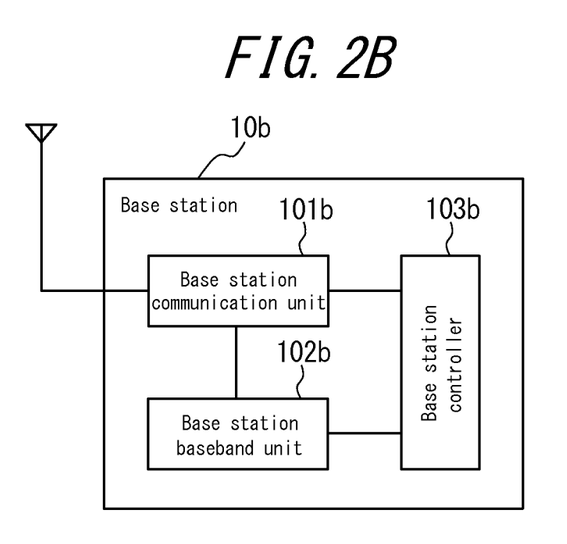

FIGS. 2A and 2B are a block diagram of the base station 10a and a block diagram of the base station 10b, respectively, according to one embodiment. As illustrated in FIG. 2A, the base station 10a includes a base station communication unit 101a, a base station baseband unit 102a, and a base station controller 103a. The base station communication unit 101a and the base station baseband unit 102a are connected to the base station controller 103a.

The base station communication unit 101a exchanges a radio signal (data) with the mobile station 11a via an antenna. The base station communication unit 101a carries out low-noise amplification, down-conversion and the like on a received radio signal (a received signal) and transmits a signal thus processed to the base station baseband unit 102a. Also, the base station communication unit 101a carries out up-conversion, amplification and the like on a baseband signal received from the base station baseband unit 102a and generates a radio signal (a transmission signal). Then, the base station communication unit 101a transmits the radio signal thus generated to the mobile station 11a via the antenna.

The base station baseband unit 102a demodulates the received signal by carrying out AD conversion, fast Fourier transform and the like on the signal received from the base station communication unit 101a and takes out the baseband signal. The base station baseband unit 102a then transmits the baseband signal to the base station controller 103a. Also, the base station baseband unit 102a modulates the baseband signal by carrying out inverse fast Fourier transform, DA conversion and the like on the baseband signal generated by the base station controller 103a. Then, the base station baseband unit 102a transmits the baseband signal thus modulated to the base station communication unit 101a.

The base station controller 103a controls and manages the entire base station 10a including each functional block thereof. The base station controller 103a may be constituted by using software executed by any appropriate processor such as a CPU (Central Processing Unit) and a dedicated processor (for example, DSP (Digital Signal Processor)) specialized for each processing.

The base station controller 103a, in order to implement the radio communication between the base station 10a and the mobile station 11a, uses the carrier A with the first frequency bandwidth. In particular, the base station controller 103a assigns a used downlink radio resource and a used uplink radio resource those being a portion of the carrier A to the mobile station 11a (and other mobile stations connected to the base station 10a). The used downlink radio resource is a radio resource used by the base station for a downlink communication (downlink) with the mobile station. The used uplink radio resource is a radio resource used by the mobile station for an uplink communication (uplink) with the base station. The base station controller 103a, by using the used downlink radio resource and the used uplink radio resource being assigned thereto, communicates with the mobile station 11a. Also, the base station controller 103a transmits information about the used downlink radio resource and the used uplink radio resource those being assigned thereto to the mobile station 11a (and other mobile stations connected to the base station 10a) via the base station communication unit 101a.

As illustrated in FIG. 2B, the base station 10b has the same configuration as the base station 10a. The base station communication unit 101b and the base station baseband unit 102b operate in the same manner as the base station communication unit 101a and the base station baseband unit 102a, respectively.

The base station controller 103b of the base station 10b, in order to implement the radio communication between the base station 10b and the mobile station 11b, uses the carrier B with the first frequency bandwidth. In particular, the base station controller 103b assigns a used downlink radio resource and a used uplink radio resource those being a portion of the carrier B to the mobile station 11b (and other mobile stations connected to the base station 10b). Then, the base station controller 103b, by using the used downlink radio resource and the used uplink radio resource being assigned thereto, communicates with the mobile station 11b. Also, the base station controller 103b transmits information about the used downlink radio resource and the used uplink radio resource those being assigned thereto to the mobile station 11b (and other mobile stations connected to the base station 11b) via the base station communication unit 101b.

Figure 3A:
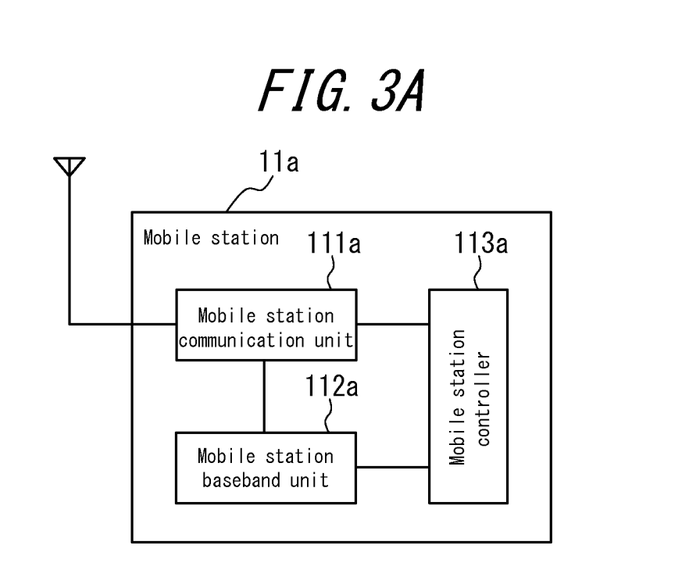
FIGS. 3A and 3B are block diagrams of mobile stations according to one embodiment.
Figure 3B:
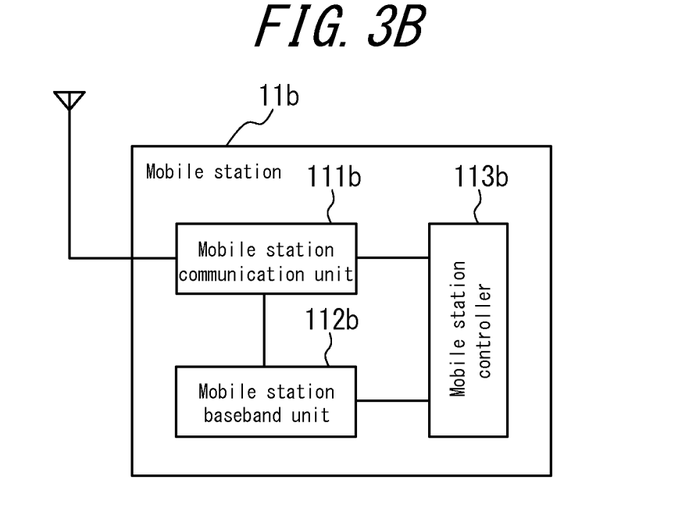

FIGS. 3A and 3B illustrate a block diagram of the mobile station 11a and a block diagram of the mobile station 11b, respectively, according to one embodiment. As illustrated in FIG. 3A, the mobile station 11a includes a mobile station communication unit 111a, a mobile station baseband unit 112a, and a mobile station controller 113a. The mobile station communication unit 111a and the mobile station baseband unit 112a are connected to the mobile station controller 113a.

The mobile station communication unit 111a exchanges the radio signal (data) with the base station 10a via an antenna. The mobile station communication unit 111a carries out the low-noise amplification, the down-conversion and the like on a received radio signal (a received signal) and transmits a signal thus processed to the mobile station baseband unit 112a. Also, the mobile station communication unit 111a carries out the up-conversion, amplification and the like on a baseband signal received from the mobile station baseband unit 112a and thus generates a radio signal (a transmission signal). Then, the mobile station communication unit 111a transmits the radio signal thus generated to the base station 10a via the antenna.

The mobile station baseband unit 112a demodulates the received signal by carrying out the AD conversion, the fast Fourier transform and the like on the signal received from the mobile station communication unit 111a and thus takes out the baseband signal. The mobile station baseband unit 112a then transmits the baseband signal to the mobile station controller 113a. Also, the mobile station baseband unit 112a modulates the baseband signal by carrying out the inverse fast Fourier transform, the DA conversion and the like on the baseband signal generated by the mobile station controller 113a. Then, the mobile station baseband unit 112a transmits the baseband signal thus modulated to the mobile station communication unit 111a.

The mobile station controller 113a controls and manages the entire mobile station 11a including each functional block thereof. The mobile station controller 113a may be constituted by using the software executed by any appropriate processor such as the CPU (Central Processing Unit) and the dedicated processor (for example, DSP (Digital Signal Processor)) specialized for each processing.

The mobile station controller 113a determines a radio resource to be used, based on the information about the assignment of the used downlink radio resource and the used uplink radio resource in the carrier A received from the base station 10a. Then, the mobile station controller 113a, by using the radio resource thus determined, carries out the communication unit with the base station 10a by means of the mobile station communication unit 111a and the mobile station baseband unit 112a.

As illustrated in the FIG. 3B, the mobile station 11b has the same configuration as the mobile station 11a. The mobile station communication unit 111b and the mobile station baseband unit 112b operate in the same manner as the mobile station communication unit 111a and the mobile station baseband unit 112a, respectively.

The mobile station controller 113b of the mobile station 11b determines a radio resource to be used, based on the information about the assignment of the used downlink radio resource and the used uplink radio resource in the carrier B received from the base station 10b. Then, the mobile station controller 113b, by using the radio resource thus determined, carries out the radio communication with the base station 10b by means of the mobile station communication unit 111b and the mobile station baseband unit 112b.

Figure 4:
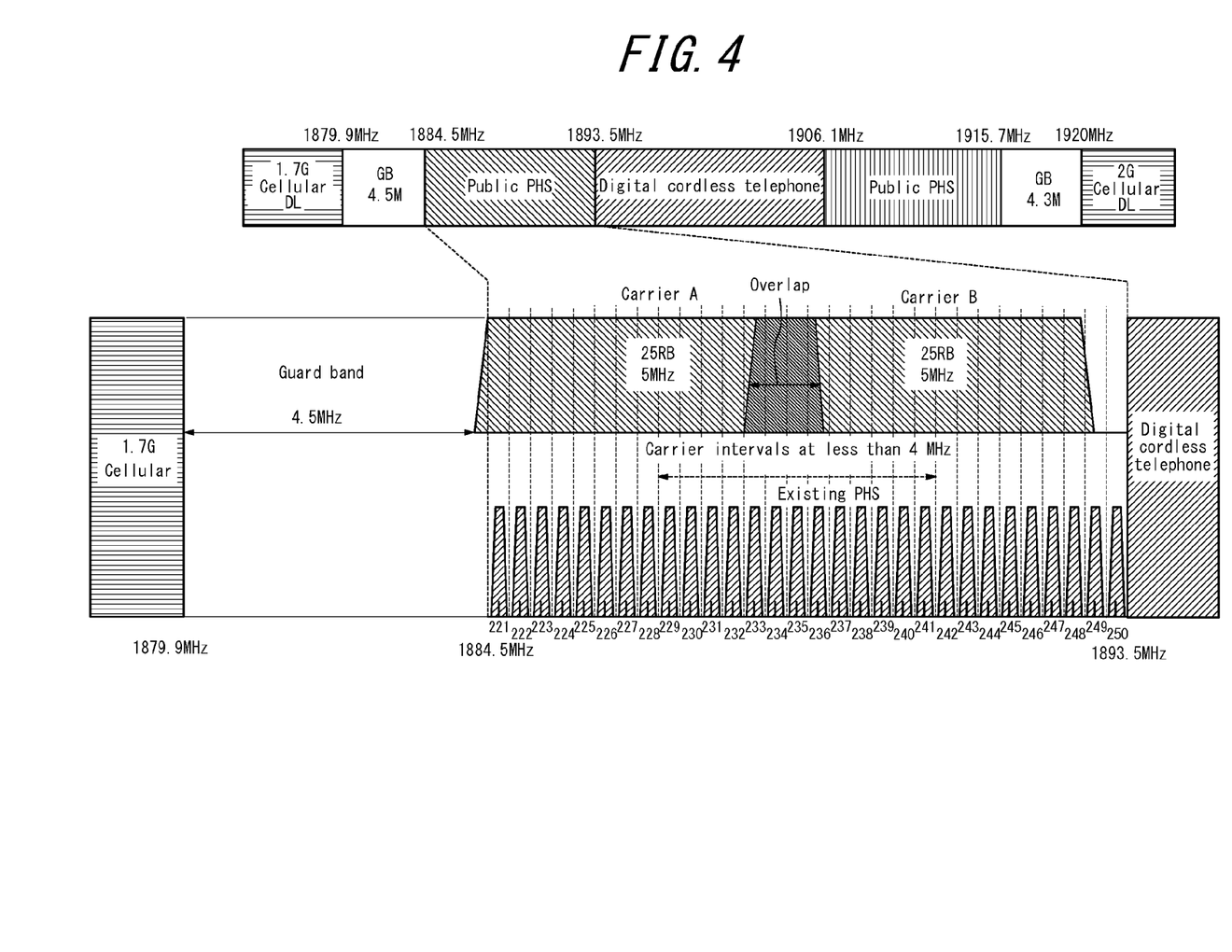
FIG. 4 is a schematic diagram of carrier assignment according to one embodiment.

Here, when the carrier A and the carrier B with the first frequency bandwidth (5 MHz) are serially assigned in the second frequency band (the 9 MHz band), a total frequency is 10 MHz, exceeding 9 MHz. Therefore, the communication system 1 according to one embodiment assigns, to the 9 MHz band, the carrier A and the carrier B in such a manner as to overlap a portion of each of the carriers. FIG. 4 illustrates a schematic diagram of the assignment of the carrier A and the carrier B having portions thereof overlapping with each other. As illustrated in FIG. 4, assignment to the 9 MHz band and therearound is as follows: a 1.7 G cellular band is assigned to a frequency band lower than 1879.9 MHz, a guard band is assigned to a frequency band of 1879.9 MHz to 1884.5 MHz, a public PHS band (the 9 MHz band) is assigned to a frequency band of 1884.5 MHz to 1893.5 MHz, a digital cordless telephone band is assigned to a frequency band of 1893.5 MHz to 1906.1 MHz, the public PHS band is assigned to a frequency band of 1906.1

MHz to 1915.7 MHz, the guard band is assigned to a frequency band of 1915.7 MHz to 1920 MHz, and a 2 GB cellular band is assigned to a frequency band of 1920 MHz or higher. As illustrated in FIG. 4, further, the communication system 1 assigns, to the 9 MHz band, the carrier A and the carrier B in such a manner as to overlap the portion of each of the carriers. In particular, since a center frequency of the carrier is assigned in 0.1 MHz increments according to LTE standard (NPL 1), the majority of the frequency band of the carrier A is assigned between 1884.5 MHz and 1889.5 MHz, and the majority of the frequency band of the carrier B is assigned between 1888.5 MHz and 1893.5 MHz. Also, the carrier A and the carrier B overlap with each other in a portion of 1 MHz between 1888.5 MHz and 1889.5 MHz. Hereinafter, the portion where the carrier A and the carrier B overlap with each other is referred to as an overlapping portion (or an overlapping band).

Figure 5:
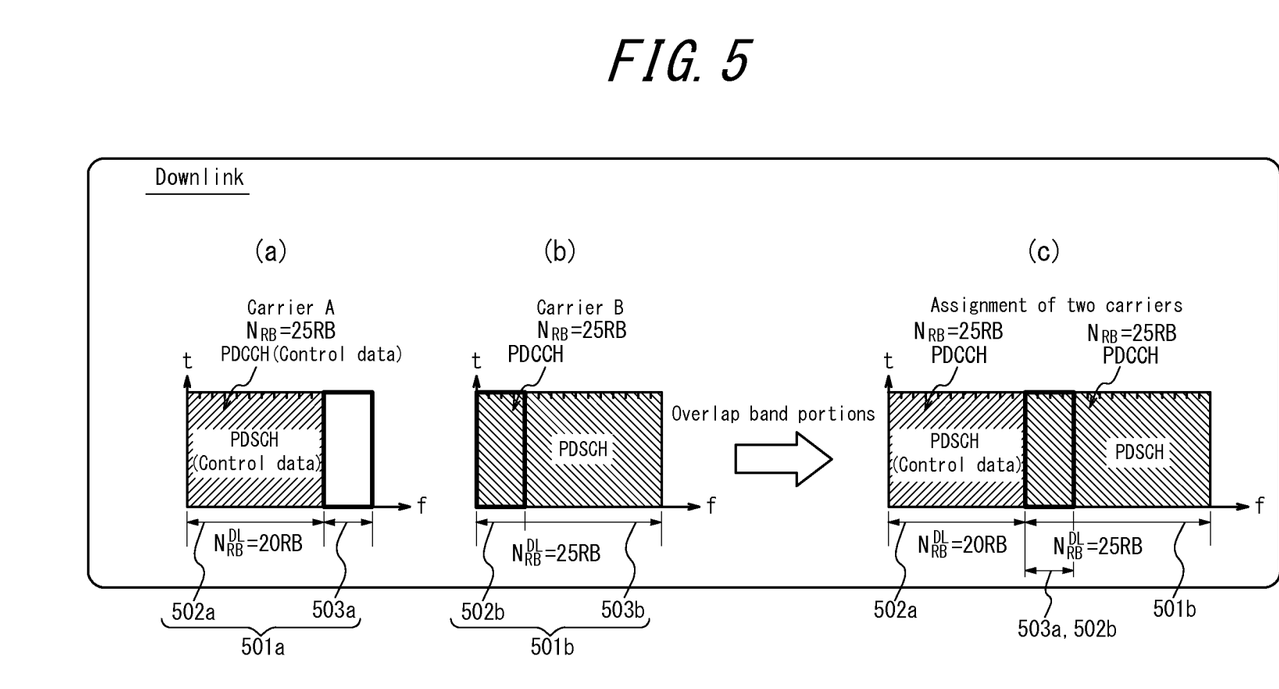
FIGS. 5A, 5B, and 5C are diagrams of the carrier assignment for downlink according to one embodiment.

FIG. 5 illustrate schematic diagrams of a radio resource using range of each carrier. As an outline, the base station 10a and the mobile station 11a those using the carrier A avoid using the overlapping portion included in the carrier A. In particular, as illustrated in FIG. 5A, the base station controller 103a of the base station 10a, in the 5 MHz band of the entire carrier A, i.e., in a range 501a having 25 RBs corresponding to the effective band of 4.5 MHz used for actual transmission/reception of the radio signal, assigns a range 502a of 3.6 MHz (20RBs) to the communication between the base station 10a and the mobile station connected thereto (for example, the mobile station 11a), without assigning a range 503a of 0.9 MHz (5RBs), i.e., the overlapping portion (the overlapping band) to the communication between the base station 10a and the mobile station connected thereto. Note that, according to the LTE standard, the bandwidth of the downlink (Downlink Bandwidth Configuration) may be changed (NPL 2), and the provisions stipulated in the LTE standard may be satisfied even when the overlapping portion is not used.

On the other hand, the base station 10b using the carrier B uses the overlapping portion included in the carrier B. In particular, as illustrated in FIG. 5B, the base station controller 103b of the base station 10b assigns the 5 MHz band of the entire carrier B, i.e., a range 501b having 25 RBs corresponding to the effective band of 4.5 MHz used for actual transmission/reception of the radio signal to the communication between the base station 10b and the mobile station connected thereto. As illustrated in FIG. 5C, a range 502b (0.9 MHz, 5 RBs) in the range 501b overlaps with the range 503a in the second frequency band, and a range 503b (3.6 MHz, 20 RBs) is assigned so as not to overlap with the carrier A.

As described above, in the downlink, the base station 10a using the carrier A having the overlapping band uses the overlapping portion (the overlapping band) included in the carrier A. On the other hand, the base station 10b using the carrier B uses the overlapping portion included in the carrier B. Therefore, radio interference in the overlapping portion may be prevented. In this way, the downlink communication may attain a high speed communication by securing the bandwidth of the carriers and prevent radio interference with another system by keeping the carriers within the 9 MHz band assigned to the communication scheme.

Figure 6:
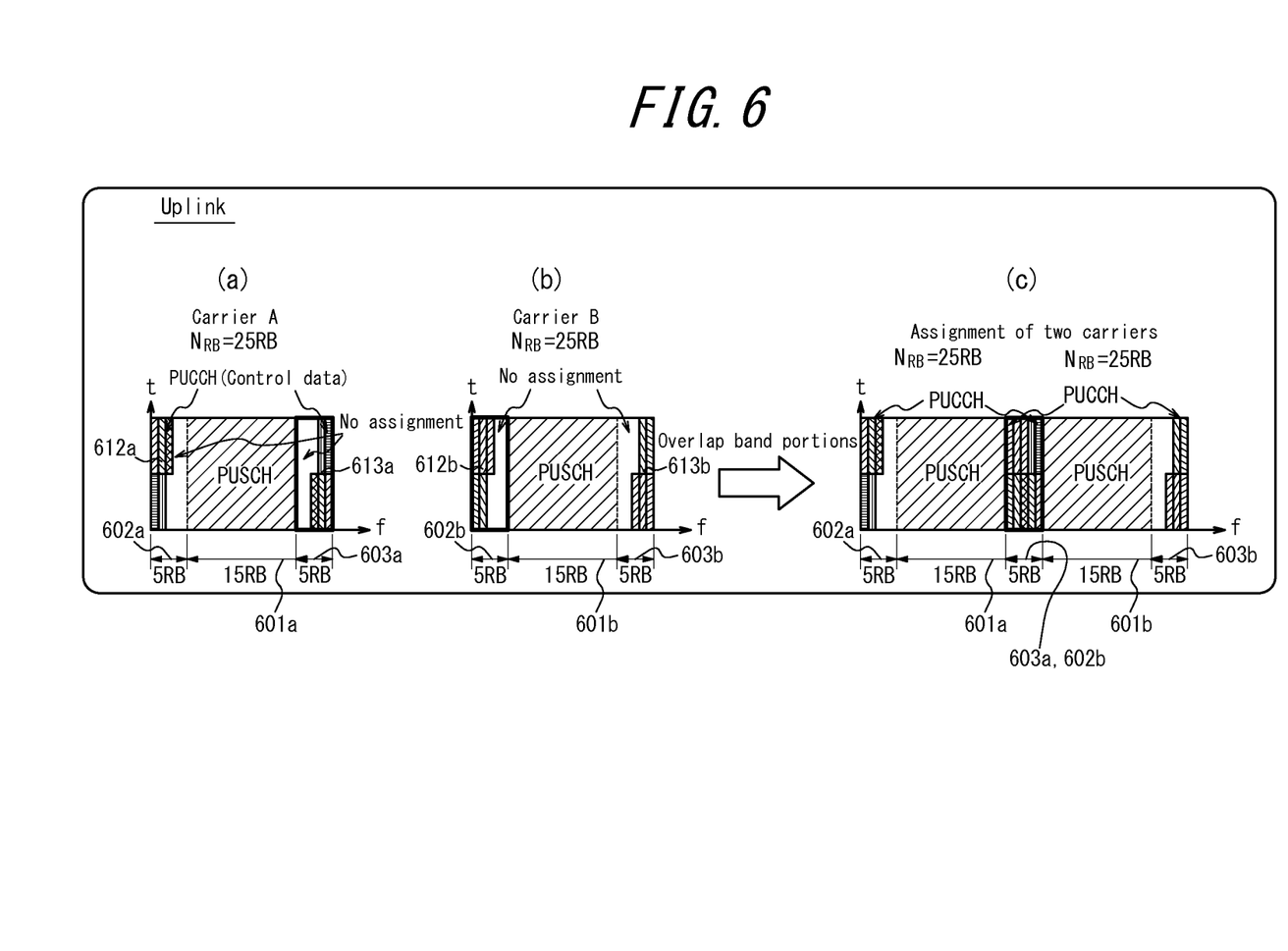
FIGS. 6A, 6B, and 6C are diagrams of the carrier assignment for uplink according to one embodiment.

FIG. 6 illustrate schematic diagrams of the radio resource using range of each carrier. As an outline, the overlapping portion (the overlapping band) is divided into a range to be used by the base station 10a and the mobile station 11a those using the carrier A and a range to be used by the base station 10b and the mobile station 11b those using the carrier B. Between the base station 10a and the mobile station 11a, and between the base station 10b and the mobile station 11b, the radio communications are carried out using radio resources of respective ranges.

The base station controller 103a of the base station 10a assigns, in the carrier A, 15RBs of a range 601a for PUSCH (Physical Uplink Shared Channel (uplink shared channel)). Also, the base station controller 103a assigns a portion of each 5RBs of a range 602a and a range 603a for PUCCH (Physical Uplink Control Channel (uplink control channel)), i.e., a channel for communicating control data. The assignment of the PUSCH and the PUCCH complies with the provisions of the TD-LTE (NPL 2). Here, the base station controller 103a assigns, in the range 602a, 2RBs with the lowest frequency and the second lowest frequency and a second half slot of the following RB with the third lowest frequency (a range 612a in FIG. 6A) for the PUCCH. Note that the second half slot refers to a 0.5 ms time range of the second half of 1 RB (2 slots). The base station controller 103a also assigns, in the range 603a, a first half slot of the RB with the third lowest frequency and 2RBs with the fourth lowest frequency and the fifth lowest frequency (a range 613a in FIG. 6A) for the PUCCH. Note that the first half slot refers to the 0.5 ms time range of the first half of 1 RB (2 slots).

The base station controller 103b of the base station 10b assigns, in the carrier B, 15RB of a range 601b for the PUSCH. Also, the base station controller 103b assigns a portion of each 5RBs of a range 602b and a range 603b for the PUCCH. Here, the base station controller 103b assigns, in the range 602b, 2RBs with the lowest frequency and the second lowest frequency and a second half slot of the following RB with the third lowest frequency (a range 612b in FIG. 6B) for the PUCCH. The base station controller 103a also assigns, in the range 603b, a first half slot of the RB with the third lowest frequency and 2RBs with the fourth lowest frequency and the fifth lowest frequency (a range 613b in FIG. 6B) for the PUCCH.

As described above, the base station 10a and the base station 10b use different radio resources of respective carriers; in particular, as illustrated in FIG. 6C, in 5RBs of the overlapping portion (10 slots), the RBs with the lowest frequency and the second lowest frequency and the second half of the RB with the third lowest frequency are used by the base station 10b, while the remaining (the first half of the RB with the third lowest frequency and the RBs with the fourth lowest frequency and the fifth lowest frequency) (5 slots in total) is used by the base station 10a. In this way, the uplink communication may attain a high speed communication by securing the bandwidth of the carriers and prevent radio interference with another system by keeping the carriers within the 9 MHz band assigned to the communication scheme.

Although in the above embodiment the overlapping portion is strictly divided into a range used by the base station 10a and the mobile station 11a those using the carrier A and a range used by the base station 10b and the mobile station 11b those using the carrier B, the overlapping portion is not limited thereto but may be divided into ranges preferentially used by each of the base stations. That is, the base station 10b and the mobile station 11b may preferably use respective ranges in the carrier A and the carrier B, or may use radio resources in another range. In this case, the base station 10b and the mobile station 11b may use the same radio resource in an overlapping manner. However, since the uplink communication has orthogonal space redundancy, the base station 10a or the base station 10b may determine to which carrier the signal belongs, within a certain range. Therefore, when the carrier A and the carrier B use the radio resource at the same frequency in the same time range, the radio interference does not occur within a certain range.

Next, operations in the communication system 1 according to one embodiment will be described with reference to flowcharts illustrated in FIG. 7.

Figure 7A:
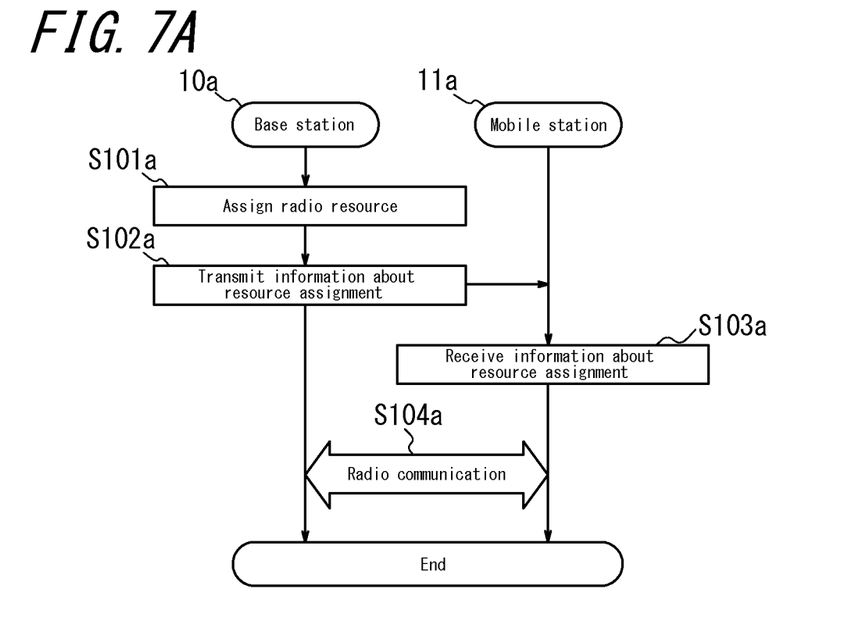
FIGS. 7A and 7B are flowcharts illustrating operations in the communication system according to one embodiment.

FIG. 7A illustrates an operation of the base station 10a and the mobile station 11a of the communication system 1 according to one embodiment.

First, the base station controller 103a assigns the used downlink radio resource and the used uplink radio resource included in the carrier A to the mobile station 11a (and other mobile stations connected to the base station 10a) (step S101a).

At this time, the base station controller 103a, for the downlink, assigns 3.6 MHz of 5 MHz (the effective band of 4.5 MHz) of the entire carrier A, i.e., 20RBs of the range 502a for the communication between the base station 10a and the mobile stations connected thereto, without assigning a 0.9 MHz range (5RBs) overlapping with the carrier B for the communication therebetween.

The base station controller 103a, for the uplink, assigns 15 RBs of the range 601a for the PUSCH. Also, the base station controller 103a assigns the range 612a of the range 602a for the PUCCH. Further, the base station controller 103a assigns the range 613a of the range 603a for the PUCCH.

Next, the base station controller 103a transmits the information about the assignment of the used downlink radio resource and the used uplink radio resource to the mobile station 11a (and other mobile stations connected to the base station 10a) via the base station communication unit 101a (step S102a). The mobile station 11a receives this information (step S103a).

Subsequently, the base station controller 103a communicates with the mobile station 11a by means of the base station communication unit 101a and the base station baseband unit 102a (step S104a).

Figure 7B:
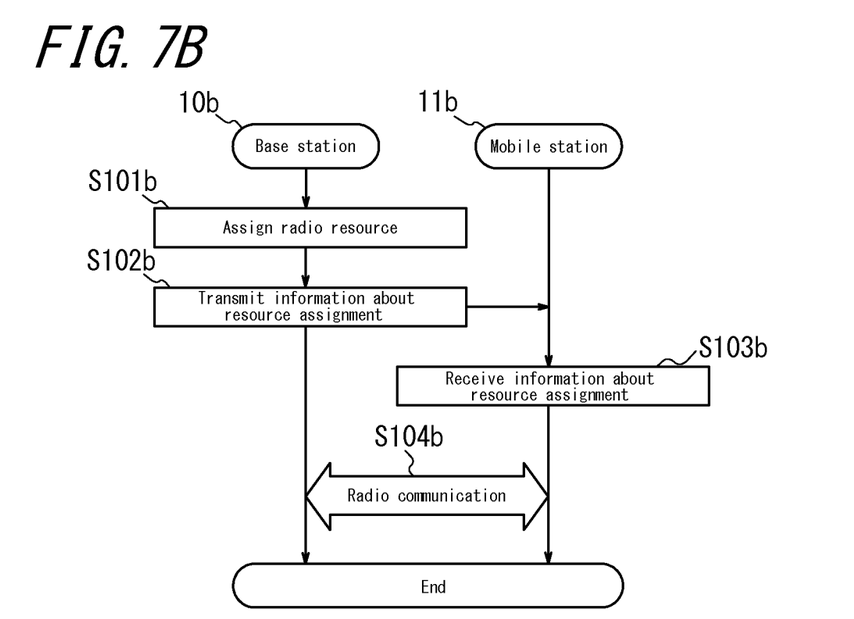

FIG. 7B illustrates operations of the base station 10b and the mobile station 11b. First, the base station controller 103b assigns the used downlink radio resource and the used uplink radio resource included in the carrier B to the mobile station 11b (and other mobile stations connected to the base station 10b) (step S101b).

At this time, the base station controller 103b, for the downlink, assigns all of 5 MHz (the effective band of 4.5 MHz) of the entire carrier B including a portion overlapping with the carrier A to the communication with the mobile station connected to the base station 10b.

The base station controller 103b, for the uplink, assigns 15 RB of the range 601b for the PUSCH. Also, the base station controller 103b assigns the range 612b of the range 602b for the PUCCH. Further, the base station controller 103b assigns the range 613b of the range 603b for the PUCCH.

Next, the base station controller 103b transmits the information about the assignment of the used downlink radio resource and the used uplink radio resource to the mobile station 11b (and other mobile stations connected to the base station 10b) via the base station communication unit 101b (step S102b). The mobile station 11b receives this information (step S103b).

Subsequently, the base station controller 103b communicates with the mobile station 11b by means of the base station communication unit 101b and the base station baseband unit 102b (step S104b).

As described above, in the communication system 1 according to one embodiment employing the communication scheme such as the TD-LTE, for the downlink, the overlapping portion to which a plurality of carriers are assigned is not used by the communication apparatuses on one side (the base station 10a and the mobile station 11a) but used by the communication apparatuses on the other side (the base station 10b and the mobile station 11b). Thereby, a high speed communication is attained by securing the bandwidth of the carriers and the radio interference with another system is prevented by keeping the carriers within the frequency band assigned to the communication scheme. For the uplink, the overlapping portion to which a plurality of carriers are assigned is (preferentially) divided into respective ranges to be used by the communication apparatuses (the base station 10a and the mobile station 11a, and the base station 10b and the mobile station 11b). Thereby, a high speed communication may be attained by securing the bandwidth of the carriers and the radio interference with another system is prevented by keeping the carriers within the frequency band assigned to the communication scheme.

Although in the present embodiment the communication system 1 uses the second frequency band, i.e., the 9 MHz band, the second frequency band is not limited thereto but may be a frequency band lower than, or higher than, 9 MHz. In this case, depending on the bandwidth of the second frequency band, the first frequency bandwidth and the bandwidth of the overlapping portion used by a plurality of carriers are appropriately changed.

Although in the present embodiment, as illustrated in FIG. 5, the base station 10a and the mobile station 11a avoid using the overlapping portion of the carrier A, while the base station 10b and the mobile station 11b use the overlapping portion in the carrier B, such assignment is not restrictive. The base station 10a and the mobile station 11a may use the overlapping portion of the carrier A, while the base station 10b and the mobile station 11b avoid using the overlapping portion of the carrier B.

Although in the present embodiment, as illustrated in FIG. 6, the range 612a of the range 602a and the range 613a of the range 603a (602b) of the carrier A and the range 612a of the range 602b (603a) and the range 613b of the range 603b of the carrier B are assigned for the PUCCH, such assignment is not restrictive; the ranges only need to be determined in such a manner that the radio resource used by the carrier A and the radio resource used by the carrier B do not overlap with each other.

Although the present invention has been described based on the figures and the embodiment, it is to be understood that various modifications and changes may be implemented based on the present disclosure by those who are ordinarily skilled in the art. Accordingly, such modifications and changes are included in the scope of the present invention. For example, functions and the like included in each means, each step and the like may be reassigned without logical inconsistency, so as to combine a plurality of means or steps together or to divide them.

Regarding the above embodiment, the following appendices are further disclosed.

(Supplementary Note 1)

A communication system having a plurality of communication apparatuses for carrying out a radio communication by assigning the plurality of communication apparatuses to a second frequency band with a predetermined bandwidth to be exceeded by carriers with a first frequency bandwidth serially assigned, the communication system assigning each of the carriers to the second frequency band in such a manner as to overlap a portion of each of the carriers, and the communication apparatus using one of the carriers having the overlapping portion avoiding using the overlapping portion of the one of the carriers.

(Supplementary Note 2)

The communication system according to Supplementary Note 1, wherein the communication apparatus for carrying out the radio communication by using the other carrier having the overlapping portion transmits data to another communication apparatus by using the overlapping portion of the other carrier.

(Supplementary Note 3)

The communication system according to Supplementary Note 2 or 3, wherein an effective band for transmitting and receiving a radio signal in the first frequency bandwidth is 4.5 MHz, and the bandwidth of the second frequency band and the bandwidth of the overlapping portion are 9 MHz and 0.9 MHz, respectively.

(Supplementary Note 4)

A communication method of carrying out a radio communication by assigning a plurality of carriers to a second frequency band with a predetermined bandwidth to be exceeded by carriers with a first frequency bandwidth serially assigned, the communication method comprising:

assigning each of the carriers to the second frequency band in such a manner as to overlap a portion of each of the carriers, and the communication apparatus using one of the carriers having the overlapping portion avoiding using the overlapping portion of the one of the carriers.

(Supplementary Note 5)

The communication system according to Supplementary Note 4, wherein the communication apparatus for carrying out the radio communication by using the other carrier having the overlapping portion transmits data to another communication apparatus by using the overlapping portion of the other carrier.

(Supplementary Note 6)

The communication method according to claim 4 or 5, wherein an effective band for transmitting and receiving a radio signal in the first frequency bandwidth is 4.5 MHz, and the bandwidth of the second frequency band and the bandwidth of the overlapping portion are 9 MHz and 0.9 MHz, respectively.

(Supplementary Note 7)

A communication apparatus in a communication system having a plurality of communication apparatuses for carrying out a radio communication by assigning the plurality of communication apparatuses to a second frequency band with a predetermined bandwidth to be exceeded by carriers with a first frequency bandwidth serially assigned, the communication apparatus assigning each of the carriers to the second frequency band in such a manner as to overlap a portion of each of the carriers, and the communication apparatus using one of the carriers having the overlapping portion and avoiding using the overlapping portion of the one of the carriers.

(Supplementary Note 8)

A communication apparatus in a communication system having a plurality of communication apparatuses for carrying out a radio communication by assigning the plurality of communication apparatuses to a second frequency band with a predetermined bandwidth to be exceeded by carriers with a first frequency bandwidth serially assigned, the communication apparatus assigning each of the carriers to the second frequency band in such a manner as to overlap a portion of each of the carriers, and the communication apparatus using one of the carriers having the overlapping portion and transmitting data to another communication apparatus by using the overlapping portion of the one of the carriers.

(Supplementary Note 9)

The communication method according to Supplementary Note 7 or 8, wherein an effective band for transmitting and receiving a radio signal in the first frequency bandwidth is 4.5 MHz, and the bandwidth of the second frequency band and the bandwidth of the overlapping portion are 9 MHz and 0.9 MHz, respectively.

REFERENCE SIGNS LIST 1 communication system
10*a*, 10*b* base station (communication apparatus)
11*a*, 11*b* mobile station (communication apparatus)
101*a*, 101*b* base station communication unit
102*a*, 102*b* base station baseband unit
103*a*, 103*b* base station controller
111*a*, 111*b* mobile station communication unit
112*a*, 112*b* mobile station baseband unit
113*a*, 113*b* mobile station controller
501*a*, 502*a*, 503*a* range
501*b*, 502*b*, 503*b* range
601*a*, 602*a*, 603*a*, 612*a*, 613*a* range
601*b*, 602*b*, 603*b*, 612*b*, 613*b* range

The invention claimed is:

1. A communication system comprising:
a plurality of communication apparatuses for carrying out a radio communication by assigning a plurality of carriers to a second frequency band with a predetermined bandwidth to be exceeded by carriers with a first frequency bandwidth serially assigned, the communication system
assigning each of the carriers to the second frequency band in such a manner as to overlap a portion of each of the carriers, and a first communication apparatus using one of the carriers having the overlapping portion and a second communication apparatus using an other carrier dividing the overlapping portion by a radio resource as a unit based on a frequency and time into ranges to be used by the each of the communication apparatus preferentially, and
the first communication apparatus and the second communication apparatus receive, at the same timing, only control data from mobile stations by preferentially using respective radio resources obtained by dividing the overlapping portion.

2. The communication system according to claim 1, wherein
the first communication apparatus and the second communication apparatus receive data from the mobile stations at a first timing, and transmit data to the mobile stations at a second timing,
when each of the carriers are assigned to the second frequency band in such a manner as to overlap a portion of each of the carriers, a rule determining the ranges used by the first communication apparatus and the second communication apparatus is different at the first timing and the second timing,
at the first timing, each of the carriers are assigned to the second frequency band in such a manner as to overlap a portion of each of the carriers, the first communication apparatus and the second communication apparatus receive only control data by dividing the overlapping portion into ranges to be used by the each of the communication apparatus preferentially in such a manner that the first communication apparatus uses one of the carriers having the overlapping portion and the second communication apparatus uses the other carrier, and at the second timing, each of the carriers are assigned to the second frequency band in such a manner as to overlap a portion of each of the carriers, the first communication apparatus using one of the carriers having the overlapping portion or the second communication apparatus avoid using the overlapping portion of the one of the carriers.

3. The communication system according to claim 1, wherein
an effective band for transmitting and receiving a radio signal in the first frequency bandwidth is 4.5 MHz, and the bandwidth of the second frequency band and the bandwidth of the overlapping portion are 9 MHz and 0.9 MHz, respectively.

4. The communication system according to claim 3, wherein
the overlapping portion consists of 10 slots, and the first communication apparatus preferentially uses a range of the overlapping portion with a higher frequency, while the second communication apparatus preferentially uses a range of the overlapping portion with a lower frequency.

5. A communication method having a plurality of communication apparatuses for carrying out a radio communication by assigning a plurality of carriers to a second frequency band with a predetermined bandwidth to be exceeded by carriers with a first frequency bandwidth serially assigned, the communication method comprising:
assigning each of the carriers to the second frequency band in such a manner as to overlap a portion of each of the carriers, and a first communication apparatus using one of the carriers having the overlapping portion and a second communication apparatus using an other carrier dividing the overlapping portion by a radio resource as a unit based on a frequency and time into ranges to be used by the each of the communication apparatus preferentially, and
the first communication apparatus and the second communication apparatus receive, at the same timing, only control data from mobile stations by preferentially using respective radio resources obtained by dividing the overlapping portion.

6. The communication method according to claim 5, wherein
the first communication apparatus and the second communication apparatus receive data from the mobile stations at a first timing, and transmit data to the mobile stations at a second timing,
when each of the carriers are assigned to the second frequency band in such a manner as to overlap a portion of each of the carriers, a rule determining the ranges used by the first communication apparatus and the second communication apparatus is different at the first timing and the second timing,
at the first timing, each of the carriers are assigned to the second frequency band in such a manner as to overlap a portion of each of the carriers, the first communication apparatus and the second communication apparatus receive only control data by dividing the overlapping portion into ranges to be used by the each of the communication apparatus preferentially in such a manner that the first communication apparatus uses one of the carriers having the overlapping portion and the second communication apparatus uses using the other carrier, and at the second timing, each of the carriers are assigned to the second frequency band in such a manner as to overlap a portion of each of the carriers, the first communication apparatus using one of the carriers having the overlapping portion or the second communication apparatus avoid using the overlapping portion of the one of the carriers.

7. The communication method according to claim 5, wherein
an effective band for transmitting and receiving a radio signal in the first frequency bandwidth is 4.5 MHz, and the bandwidth of the second frequency band and the bandwidth of the overlapping portion are 9 MHz and 0.9 MHz, respectively.

8. The communication method according to claim 7, wherein
the overlapping portion consists of 10 slots, and the first communication apparatus preferentially uses a range of the overlapping portion with a higher frequency, while the second communication apparatus preferentially uses a range of the overlapping portion with a lower frequency.

9. A communication apparatus of a communication system comprising:
a plurality of communication apparatuses for carrying out a radio communication by assigning a plurality of carriers to a second frequency band with a predetermined bandwidth to be exceeded by carriers with a first frequency bandwidth serially assigned, the communication apparatus
using one of the carriers assigned to the second frequency band in such a manner as to overlap a portion of each of the carriers, and
dividing the overlapping portion by a radio resource as a unit based on a frequency and time into ranges assigned to each of the communication apparatuses and receive only control data from mobile stations by preferentially using respective radio resources obtained by dividing the overlapping portion.

10. The communication apparatus according to claim 9, wherein
the communication apparatus and other communication apparatus using an other carrier receive data from the mobile stations at a first timing, and transmit data to the mobile stations at a second timing,
when each of the carriers are assigned to the second frequency band in such a manner as to overlap a portion of each of the carriers, a rule determining the ranges used by the communication apparatus and the other communication apparatus is different at the first timing and the second timing,
at the first timing, each of the carriers are assigned to the second frequency band in such a manner as to overlap a portion of each of the carriers, the communication apparatus and the other communication apparatus receive only control data by dividing the overlapping portion into ranges to be used by the each of the communication apparatus preferentially in such a manner that the communication apparatus uses one of the carriers having the overlapping portion and the other communication apparatus uses the other carrier, and
at the second timing, each of the carriers are assigned to the second frequency band in such a manner as to overlap a portion of each of the carriers, the communication apparatus using one of the carriers having the overlapping portion or the other communication apparatus avoid using the overlapping portion of the one of the carriers.

11. The communication apparatus according to claim 9, wherein
an effective band for transmitting and receiving a radio signal in the first frequency bandwidth is 4.5 MHz, and the bandwidth of the second frequency band and the bandwidth of the overlapping portion are 9 MHz and 0.9 MHz, respectively.

12. The communication apparatus according to claim 11, wherein
the overlapping portion consists of 10 slots, and the first communication apparatus preferentially uses a range of the overlapping portion with a higher frequency, while the second communication apparatus preferentially uses a range of the overlapping portion with a lower frequency.

* * * * *